United States Patent
Lansing et al.

(10) Patent No.: US 7,738,460 B2
(45) Date of Patent: *Jun. 15, 2010

(54) APPARATUS AND METHOD FOR HARDWARE CREATION OF A HEADER

(75) Inventors: Shane P. Lansing, Mission Viejo, CA (US); Heratch Avakian, Glendale, CA (US)

(73) Assignee: Broadcom Corporation, Irvine, CA (US)

( * ) Notice: Subject to any disclaimer, the term of this patent is extended or adjusted under 35 U.S.C. 154(b) by 272 days.

This patent is subject to a terminal disclaimer.

(21) Appl. No.: 11/892,011

(22) Filed: Aug. 17, 2007

(65) Prior Publication Data

US 2008/0089342 A1    Apr. 17, 2008

Related U.S. Application Data

(63) Continuation of application No. 10/218,583, filed on Aug. 15, 2002.

(60) Provisional application No. 60/324,938, filed on Sep. 27, 2001.

(51) Int. Cl.
H04L 12/28 (2006.01)
(52) U.S. Cl. ............................ 370/392; 714/758
(58) Field of Classification Search ............ 370/252, 370/389, 392, 466, 469, 472, 476, 400; 714/758, 714/759, 768, 774, 779; 713/151, 160, 173, 713/189–190
See application file for complete search history.

(56) References Cited

U.S. PATENT DOCUMENTS 5,742,604 A    4/1998    Edsall et al.

(Continued)

FOREIGN PATENT DOCUMENTS

EP    0 874 503    10/1998

(Continued)

OTHER PUBLICATIONS

"BCM3300 QAMLink® Single-Chip DOCSIS Cable Modem" [online], BCM3300 Product Brief, Broadcom Corporation (1999) [retrieved on Jun. 25, 2003]. Retrieved from the Internet: <URL:http://www.broadcom.com/products/3300.html> (2 pages).

(Continued)

*Primary Examiner*—Ricky Ngo
*Assistant Examiner*—Phuongchau B Nguyen
(74) *Attorney, Agent, or Firm*—Sterne, Kessler, Goldstein & Fox, P.L.L.C.

(57) ABSTRACT

A media access controller (MAC) is configured with a header creator circuit. The header creator circuit is configured with logic for receiving a data packet and determining whether the received data packet has an existing packet header prepended thereto. The header creator circuit is further configured to determine if the length of the received data packet includes a cyclic redundancy code. Still further, the header creator circuit is configured to determine a packet header length field value for the received data packet. If the header creator circuit determines that a cyclic redundancy code needs to be included with the received data packet, then the header creator circuit is able to generate a CRC flag. If the data packet needs to be encrypted, then the header creator circuit will generate an encryption flag if it is determined that the received data packet should be encrypted. Finally, the header creator circuit generates a packet header having a plurality of fields.

13 Claims, 9 Drawing Sheets

U.S. PATENT DOCUMENTS

| | | | |
|---|---|---|---|
| 5,999,541 | A | 12/1999 | Hichey et al. |
| 6,226,771 | B1 | 5/2001 | Hilla et al. |
| 6,438,123 | B1 | 8/2002 | Chapman |
| 6,629,288 | B1 | 9/2003 | Bernath et al. |
| 6,633,564 | B1 | 10/2003 | Steer et al. |
| 6,751,230 | B1 | 6/2004 | Vogel et al. |
| 6,765,931 | B1 | 7/2004 | Rabenko et al. |
| 6,788,707 | B1 | 9/2004 | Horton et al. |
| 6,816,940 | B2 | 11/2004 | Brooks et al. |
| 6,909,715 | B1 | 6/2005 | Denney et al. |
| 6,973,668 | B1 | 12/2005 | Chen et al. |
| 6,985,492 | B1 | 1/2006 | Thi et al. |
| 7,145,887 | B1 | 12/2006 | Akgun et al. |
| 7,197,052 | B1 * | 3/2007 | Crocker ..................... 370/474 |
| 7,389,527 | B2 | 6/2008 | Bunn et al. |
| 2002/0062394 | A1 | 5/2002 | Bunn et al. |
| 2002/0093955 | A1 * | 7/2002 | Grand et al. ................ 370/389 |
| 2002/0106017 | A1 | 8/2002 | Dombkowski et al. |
| 2002/0131426 | A1 | 9/2002 | Amit et al. |
| 2002/0136203 | A1 | 9/2002 | Liva et al. |
| 2002/0191691 | A1 | 12/2002 | Holborow |
| 2003/0058862 | A1 * | 3/2003 | Lansing et al. .............. 370/392 |
| 2006/0120369 | A1 | 6/2006 | Chandran et al. |
| 2008/0089342 | A1 | 4/2008 | Lansing et al. |

FOREIGN PATENT DOCUMENTS

| | | |
|---|---|---|
| EP | 1 043 661 | 10/2000 |
| EP | 001298877 A1 | 4/2003 |

OTHER PUBLICATIONS

"BCM3310 QAMLink® Communications Processor" [online], BCM3310 Product Brief, Broadcom Corporation (1999) [retrieved on Jun. 25, 2003]. Retrieved from the Internet: <URL: http://www.broadcom.com/products/3310.html> (2 pages).

"BCM3300 QAMLink® Single-Chip DOCSIS/EURODOCSIS Cable Modem" [online], BCM3300 Product Brief, Broadcom Corporation (2003) [retrieved on Sep. 25, 2003]. Retrieved from the Internet: <URL: http://www.broadcom.com/products/3300.html> (2 pages).

"BCM3310 QAMLink® Communications Processor" [online], BCM3310 Product Brief, Broadcom Corporation (2003) [retrieved on Sep. 25, 2003]. Retrieved from the Internet: <URL: http://www.broadcom.com/products/3310.html> (2 pages).

"Radio Frequency Interface Specification SP-RFIV1.1-I05-000714" [online], Data-Over-Cable Service Interface Specifications, Cable Television Laboratories (Jul. 14, 2000) [retrieved on Mar. 20, 2002]. Retrieved from the Internet: <URL: http://www.docsis.org/docs/SP-RFIv1.1-I05-000714.pdf> (p. 171, paragraph 8.4; p. 178, last paragraph: figures 8-11, 8-12, 8-13, 8-14, and 8-15).

Goldberg, L., "MCNS/DOCSIS MAC Clears a Path for the Cable-Modem Invasion," Electronic Design 45:69-70, 74, 78, and 80, Penton Publishing (Dec. 1, 1997).

Sumner, M., "DOCSIS 1.1 Overview" [online], Cable Labs (May 3, 1999) [retrieved on Apr. 18, 2001]. Retrieved from the Internet: <URL: http://www.cablemodem.com/Euroll_Overview.pdf> (16 pages).

Schwarzfeld, G., "DOCSIS Contra DVB," *Funkschau, Franzis-Verlag K. G.,* vol. 73, pp. 51-53, No. 1/2, Jan. 7, 2000.

Quigley, T.J., "Cablemodem Standards for Advanced Quality of Service Deployments" Consumer Electronics, ICEE, pp. 282-283, Jun. 1999.

European Search Report, dated Feb. 6, 2003, issued by the European Patent Office.

* cited by examiner

PACKET HEADER DESCRIPTOR

| 31 30 | 29 28 27 26 25 24 23 22 21 20 19 18 17 16 15 14 13 12 11 10 9 8 | 7 6 5 4 3 2 1 0 |
|---|---|---|
| 0 S | QUEUE | FLAGS [4:0] | BP_SID | PKT_LEN | HDR_LEN |
| BPF | | SF_INDEX |
| FCT | FC_PARM | - | PHS_PNTR |
| | BPNTR | |

FIG. 7 ated to communication systems. More particularly, the present invention is related to systems and methods for creating headers.

APPARATUS AND METHOD FOR HARDWARE CREATION OF A HEADER

CROSS-REFERENCE TO RELATED APPLICATIONS

This application is a continuation of U.S. patent application Ser. No. 10/218,583, filed Aug. 15, 2002, which claims the benefit of U.S. Provisional Application No. 60/324,938 (inactive), filed Sep. 27, 2001, both of which are incorporated herein by reference in their entireties.

BACKGROUND OF THE INVENTION

1. Field of the Invention

The present invention is generally related to communication systems. More particularly, the present invention is related to systems and methods for creating headers.

2. Related Art

Conventional cable modem systems utilize DOCSIS (Data Over Cable System Interface Specification)—compliant equipment and protocols to transfer data between one or more cable modems (CM) and a cable modem termination system (CMTS). DOCSIS generally refers to a group of specifications that define industry standards for cable headend and cable modem equipment. In part, DOCSIS sets forth requirements and objectives for various aspects of cable modem systems including operations support systems, management, data interfaces, as well as network layer, data link layer, and physical layer transport for cable modem systems. The most current version of the DOCSIS specification is DOCSIS 1.1.

In accordance with the DOCSIS specification, a media access control frame (MAC) is applied to each data packet transmitted and is used to convey information about the data packet as it is passed through the system from one component to the next. As shown in FIG. 5, the MAC frame includes a DOCSIS header portion and an optional Data PDU portion. The DOCSIS header identifies the contents of the MAC frame and contains information for directing the data packets to the proper location in the cable modem system. The Data PDU portion contains the payload data such as voice or text data for example. The DOCSIS header also provides data format information related to the PDU (payload) portion.

Heretofore, cable modems and cable modem termination systems have relied upon the host processor system and software to generate the DOCSIS header. Reliance upon software, however, results in significant processing overhead. Thus, what is needed is an apparatus and method for creating DOCSIS headers in hardware such that the performance of the overall system is improved.

BRIEF DESCRIPTION OF THE FIGURES

FIG. 7 is an illustration of a Packet Header Descriptor according to the DOCSIS protocol.

DETAILED DESCRIPTION

Exemplary Apparatus Embodiments

Figure 1:
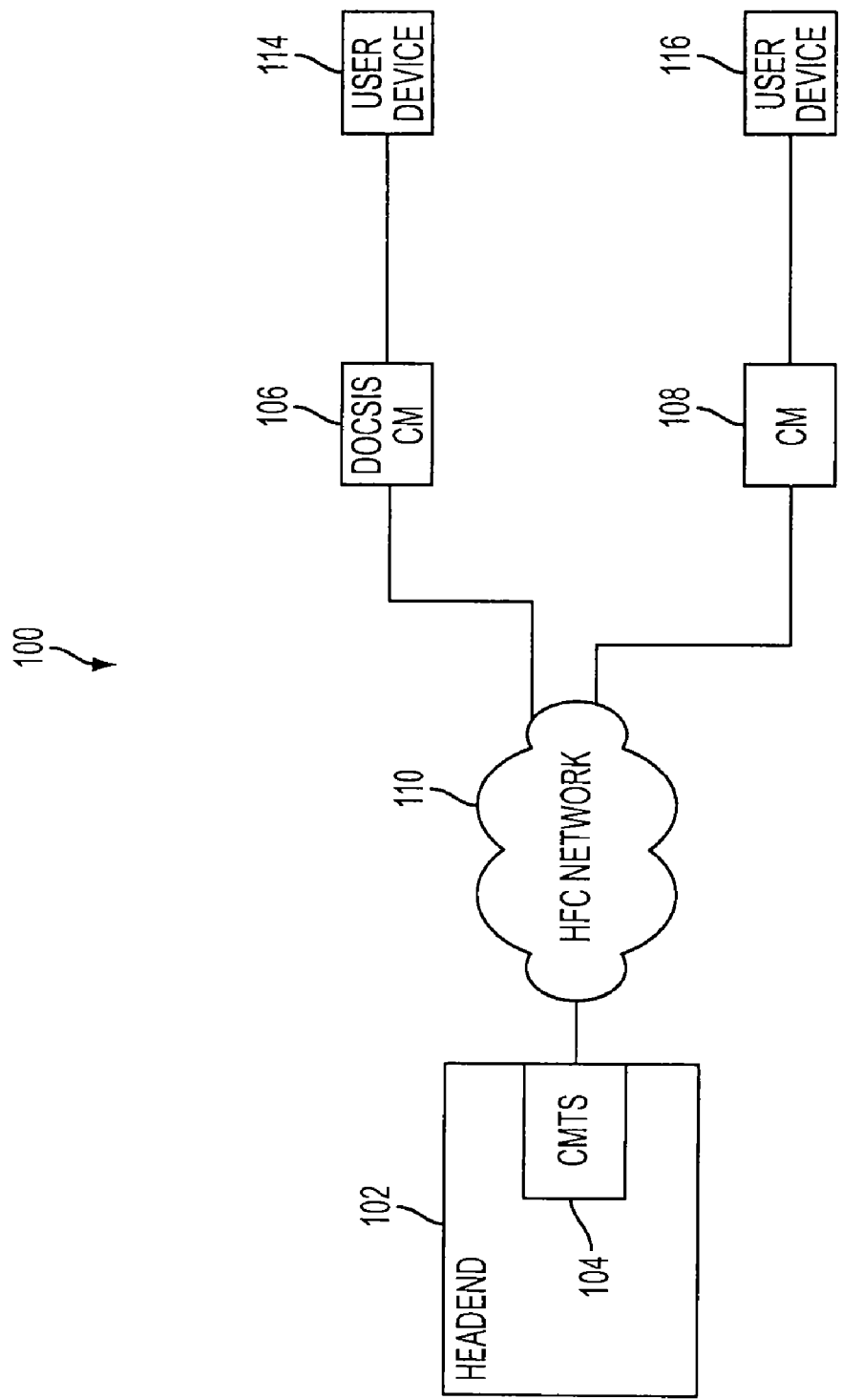
FIG. 1 is a high level block diagram of a cable modem system in accordance with embodiments of the present invention.

FIG. 1 is a high level block diagram of an example cable modem system 100 in accordance with embodiments of the present invention. The cable modem system 100 enables voice communications, video and data services based on a bi-directional transfer of packet-based traffic, such as Internet protocol (IP) traffic, between a cable system headend 102 and a plurality of cable modems over a hybrid fiber-coaxial (HFC) cable network 110. In the example cable modem system 100, only two cable modems 106 and 108 are shown for clarity. In general, any number of cable modems may be included in the cable modem system of the present invention.

The cable headend 102 is comprised of at least one cable modem termination system (CMTS) 104. The CMTS 104 is the portion of the cable headend 102 that manages the upstream and downstream transfer of data between the cable headend 102 and the cable modems 106 and 108, which are located at the customer premises. The CMTS 104 broadcasts information downstream to the cable modems 106 and 108 as a continuous transmitted signal in accordance with a time division multiplexing (TDM) technique. Additionally, the CMTS 104 controls the upstream transmission of data from the cable modems 106 and 108 to itself by assigning to each cable modem 106 and 108 short grants of time within which to transfer data. In accordance with this time domain multiple access (TDMA) technique, each cable modem 106 and 108 may only send information upstream as short burst signals during a transmission opportunity allocated to it by the CMTS 104.

As shown in FIG. 1, the CMTS 102 further serves as an interface between the HFC network 110 and a packet-switched network 112, transferring IP packets received from the cable modems 106 and 108 to the packet-switched network 112 and transferring IP packets received from the packet-switched network 112 to the cable modems 106 and 108 when appropriate. In embodiments, the packet-switched network 112 comprises the Internet.

In addition to the CMTS 104, the cable headend 102 may also include one or more Internet routers to facilitate the connection between the CMTS 104 and the packet-switched network 112, as well as one or more servers for performing necessary network management tasks.

The HFC network 110 provides a point-to-multipoint topology for the high-speed, reliable, and secure transport of data between the cable headend 102 and the cable modems 106 and 108 at the customer premises. As will be appreciated by persons skilled in the relevant art(s), the HFC network 110 may comprise coaxial cable, fiberoptic cable, or a combination of coaxial cable and fiberoptic cable linked via one or more fiber nodes.

Each of the cable modems 106 and 108 operates as an interface between the HFC network 110 and at least one attached user device. In particular, the cable modems 106 and 108 perform the functions necessary to convert downstream signals received over the HFC network 110 into IP data packets for receipt by an attached user device. Additionally, the cable modems 106 and 108 perform the functions necessary to convert IP data packets received from the attached user device into upstream burst signals suitable for transfer over the HFC network 110. In the example cable modem system 100, each cable modem 106 and 108 is shown supporting only a single user device for clarity. In general, each cable modem 106 and 108 is capable of supporting a plurality of user devices for communication over the cable modem system 100. User devices may include personal computers, data terminal equipment, telephony devices, broadband media players, network-controlled appliances, or any other device capable of transmitting or receiving data over a packet-switched network.

In the example cable modem system 100, cable modem 106 represents a conventional DOCSIS-compliant cable modem. In other words, cable modem 106 transmits data packets to the CMTS 104 in formats that adhere to the protocols set forth in the DOCSIS specification. Cable modem 108 is likewise capable of transmitting data packets to the CMTS 104 in standard DOCSIS formats.

Furthermore, in the example cable modem system 100, the CMTS 104 operates to receive and process data packets transmitted to it in accordance with the protocols set forth in the DOCSIS specification.

Figure 2:
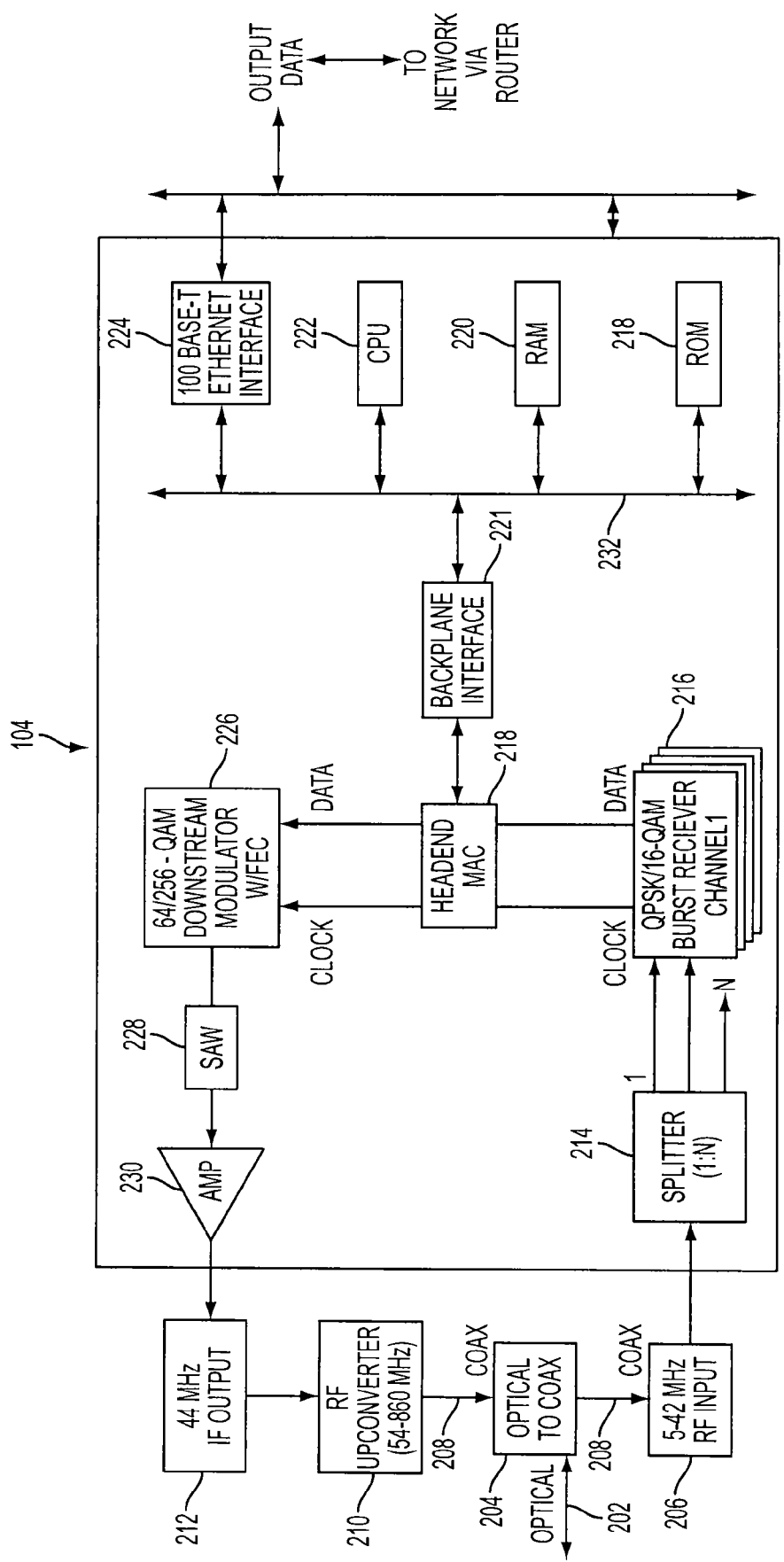
FIG. 2 is a schematic block diagram of a cable modem termination system in accordance with embodiments of the present invention.

B. Example Cable Modem System Components in Accordance with Embodiments of the Present Invention FIG. 2 depicts a schematic block diagram of an implementation of the CMTS 104 of cable modem system 100, which is presented by way of example, and is not intended to limit the present invention. The CMTS 104 is configured to receive and transmit signals to and from the HFC network 110, a portion of which is represented by the optical fiber 202 of FIG. 2. Accordingly, the CMTS 104 will be described in terms of a receiver portion and a transmitter portion.

The receiver portion includes an optical-to-coax stage 204, an RF input 206, a splitter 214, and a plurality of burst receivers 216. Reception begins with the receipt of upstream burst signals originating from one or more cable modems by the optical-to-coax stage 204 via the optical fiber 202. The optical-to-coax stage 204 routes the received burst signals to the radio frequency (RF) input 206 via coaxial cable 208. In embodiments, these upstream burst signals having spectral characteristics within the frequency range of roughly 5-42 MHz.

The received signals are provided by the RF input 206 to the splitter 214 of the CMTS 104, which separates the RF input signals into N separate channels. Each of the N separate channels is then provided to a separate burst receiver 216 which operates to demodulate the received signals on each channel in accordance with either a Quadrature Phase Shift Key (QPSK) or 16 Quadrature Amplitude Modulation (QAM) technique to recover the underlying information signals. Each burst receiver 216 also converts the underlying information signals from an analog form to digital form. This digital data is subsequently provided to the headend media access control (MAC) 218.

The headend MAC 218 operates to process the digital data in accordance with the DOCSIS specification. The headend MAC is in electrical communication with random access memory (RAM) 220 and read only memory (ROM) 218 via a backplane interface 221 and a shared communications medium 232. In embodiments, the shared communications medium 232 may comprise a computer bus or a multiple access data network.

The headend MAC 218 is also in electrical communication with the Ethernet interface 224 via both the backplane interface 220 and the shared communications medium 232. When appropriate, Ethernet packets recovered by the headend MAC 218 are transferred to the Ethernet interface 224 for delivery to the packet-switched network 112 via a router.

The transmitter portion of the CMTS 104 includes a downstream modulator 226, a surface acoustic wave (SAW) filter 228, an amplifier 230, an intermediate frequency (IF) output 212, a radio frequency (RF) upconverter 210 and the optical-to-coax stage 204. Transmission begins with the generation of a digital broadcast signal by the headend MAC 218. The digital broadcast signal may include DOCSIS headers and data originally received from the packet-switched network 112 via the Ethernet interface 224. The headend MAC 218 outputs the digital broadcast signal to the downstream modulator 226 which converts it into an analog form and modulates it onto a carrier signal in accordance with either a 64-QAM or 256-QAM technique.

The modulated carrier signal output by the downstream modulator 256 is input to the SAW filter 228 which passes only spectral components of the signal that are within a desired bandwidth. The filtered signal is then output to an amplifier 230 which amplifies it and outputs it to the IF output 212. The IF output 212 routes the signal to the RF upconverter 210, which upconverts the signal. In embodiments, the upconverted signal has spectral characteristics in the frequency range of approximately 54-860 MHz. The upconverted signal is then output to the optical-to-coax stage 204 over the coaxial cable 208. The optical-to-coax stage 204 broadcasts the signal via the optical fiber 202 of the HFC network 110.

Figure 3:
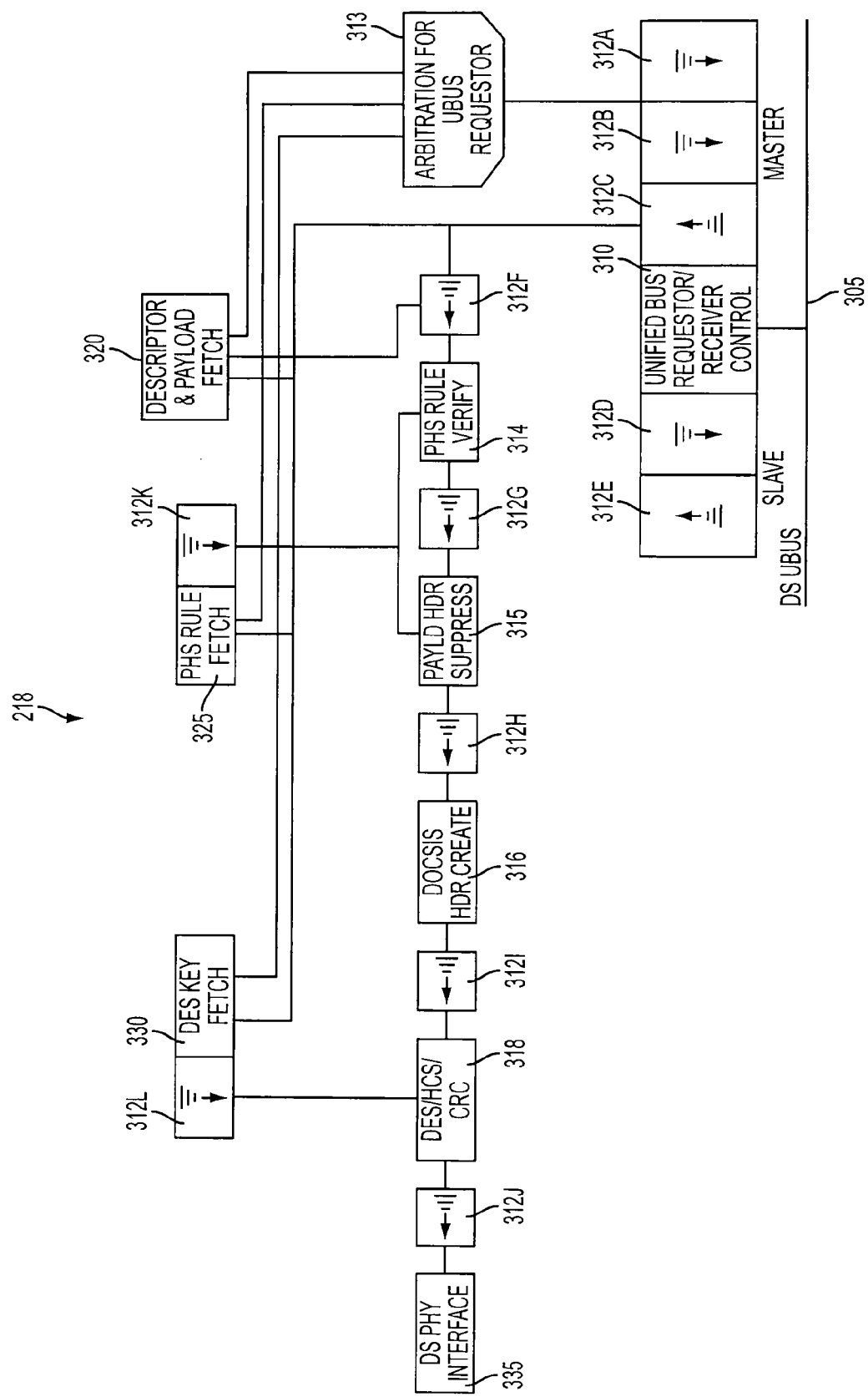
FIG. 3 is a schematic block diagram of a media access control circuit in accordance with embodiments of the present invention.

FIG. 3 provides a schematic diagram of a media access controller (MAC) 218, configured to create DOCSIS headers in accordance with embodiments of the present invention. The invention, however, is not limited to the description provided herein with respect to FIG. 1. Rather, it will be apparent to persons skilled in the relevant art(s) after reading the teachings provided herein that other functional hardware configurations are within the scope and spirit of the present invention. For example, the media access controller is found within the architecture of both a cable modem and a cable modem termination system. Accordingly, a cable modem can also be made to generate DOCSIS headers in accordance with embodiments of the present invention.

MAC 218 is comprised of a DS UBUS 305. The DS UBUS 305 is a shared internal chip bus used for carrying data packets. The DS UBUS 305 is provided to receive data packets from an external SDRAM (not shown). The types of data packets carried may include, for example, Ethernet packets or DOCSIS packets.

Once the data packets are received by MAC 218 over DS UBUS 305, the data packets are passed internally using a plurality of FIFO registers 312. FIFO registers 312A-312L are used to provide data packets to the peripherals of MAC 218 according to a first-in, first-out process.

The MAC 218 is further provided with a Unified Bus Requestor/Receiver Controller 310. The Unified Bus Requestor/Receiver Controller 310 is used by MAC 218 to request access to external memory.

An Arbitration for UBUS Requestor 313 is also found within MAC 218. The Arbitration for UBUS Requester 313 is responsible for arbitrating usage of DS UBUS 305 made necessary by requests to obtain data. For example, the components of MAC 218 might generate a request to fetch a packet encryption key or perhaps to fetch a payload header suppression rule. In response to such a request for the transfer of data, the Arbitration for UBUS Requestor 313 will allocate bandwidth on the DS UBUS 305 for handling the request.

The MAC 218 is further comprised of a Payload header suppression rule verify 314 and a Payload header suppress 315. Payload header suppression rule verify 314 is used to perform verification of a data packet payload header based upon the payload header rule. Verification is used to determine if payload header suppression should be performed.

In accordance with embodiments of the present invention, payload header suppress 315 receives successfully verified packet payload headers from the payload header suppression rule verify 314 and suppresses the payload headers using available payload header suppression rules.

Descriptor and Payload Fetch 320 is a controller used to obtain the data packet and packet header descriptor from the external SDRAM (not shown). This data is subsequently provided to PHS Rule verify 314 for use in verifying the payload header.

The fields of the packet header descriptor are described in Table 1.

TABLE 1

Packet Header Descriptor Field Descriptions

| Field | Name | Size | Description |
|---|---|---|---|
| o | Ownership | 1b | The ownership bit indicates who owns the descriptor. When set to 1, the MAC owns and is free to process the descriptor. When reset, the PCI host owns the descriptor. |
| s | Single Buffer Pkt | 1b | When this bit is set, all packet data for this packet is contained in a single buffer, and the bpntr filed points to the start of packet data. When this bit is clear, packet data may be contained in multiple linked buffer descriptors, and the bpntr field points to the start of the first buffer descriptor. |
| queue | Queue Number | 3b | Destination queue of this DOCSIS In-Band packet: 2 = High Priority 3 = Medium Priority 4 = Low Priority |
| flag[4] | Enable PHS | 1b | Perform Payload Header Suppression (PHS) |
| flag[3] | Generate CRC | 1b | When this bit is set, the In-Band DOCSIS Downstream Processor will generate and append the CRC, and the packet data and pkt_len field must not include CRC bytes. When this bit is clear, the packet data and pkt_len filed must include CRC bytes, and the In-Band DOCSIS Downstream Processor will regenerate and replace the CRC only if PHS is performed. |
| flag[2] | DOCSIS Header | 1b | Complete DOCSIS header already exists at the start of the first data buffer for this packet. |
| flag[1] | More extended header | 1b | Additional Extended Header Information exists at the start of the first data buffer for this packet. |

TABLE 1-continued

Packet Header Descriptor Field Descriptions

| Field | Name | Size | Description |
|---|---|---|---|
| flag[0] | reserved | 1b | reserved; write 0 |
| pkt_len | Packet Length | 14b | This field indicates the length of the packet, meaning specifically the total length of the data in bytes to be transferred from PCI memory (including the complete DOCSIS header or EHDR if present). If this field is zero, the PCI DMA will halt and generate an interrupt. |
| hdr_len | Header Length | 8b | If a complete DOCSIS header or additional extended header information is present in PCI memory, this field indicates the length in bytes of that data. |
| bpf[1] | odd_key | 1b | If this bit is clear, use even key for baseline privacy. Otherwise, use the odd one. |
| bpf[0] | do_bp | 1b | Perform Baseline Privacy |
| bp_sid | Baseline Privacy Service ID | 14b | This field is the Baseline Privacy Service ID to be used by the DS DOCSIS datapath controller for key lookup if do_bp is set. If do_bp is clear, a nonzero value in this field will cause the insertion of a BPI EHDR (with enable off) into the DOCSIS frame. If do_bp is clear and this field is zero, no BPI EHDR will be sent with the packet. The value represents an offset from a base address (section loc) to a location in the DS SDRAM where the byte address for the DBS key is 32*bp_sid + base address. |
| sf_indx | Service Flow Index | 16b | The Service Flow Index is used to index the per-flow MIB tables in external downstream SDRAM |
| fct | FC type | 2b | FC type to be used by DOCSIS header creator. |
| fc_parm | FC parm | 5b | FC parm to be used by DOCSIS header creator. |
| phs_pntr | PHS Rule Pointer | 24b | Pointer to the appropriate Payload Header Suppression Rule in the DS SDRAM. valid only is do_phs bit is set. |
| bpntr | Buffer or BD Pointer | 32b | When the s bit indicates that the packet is stored in a single buffer, this field is a pointer to the start of the data buffer. When the s bit indicates that multiple buffers may be in use, this field is a pointer to first buffer descriptor of the packet. |

The Descriptor and Payload Fetch 320 fetches the payload header descriptor and payload data from its FIFO 312F and stores the values from the descriptor words into local registers. The descriptor words, prepended to the start of every packet, contain control information for enabling CRC generation, PHS processing, Baseline Privacy encryption, etc.

Payload header suppression rule fetch 325 is a controller used to locally store a plurality of payload header suppression rules. The payload header suppression rules provide instructions regarding the suppression of the payload headers to the PHS rule verify 314 and payload header suppress 315.

Once each data packet has been processed by the PHS rule verify 314 and the payload header suppress 315, the data packet is passed to DOCSIS header creator 316.

Figure 5:
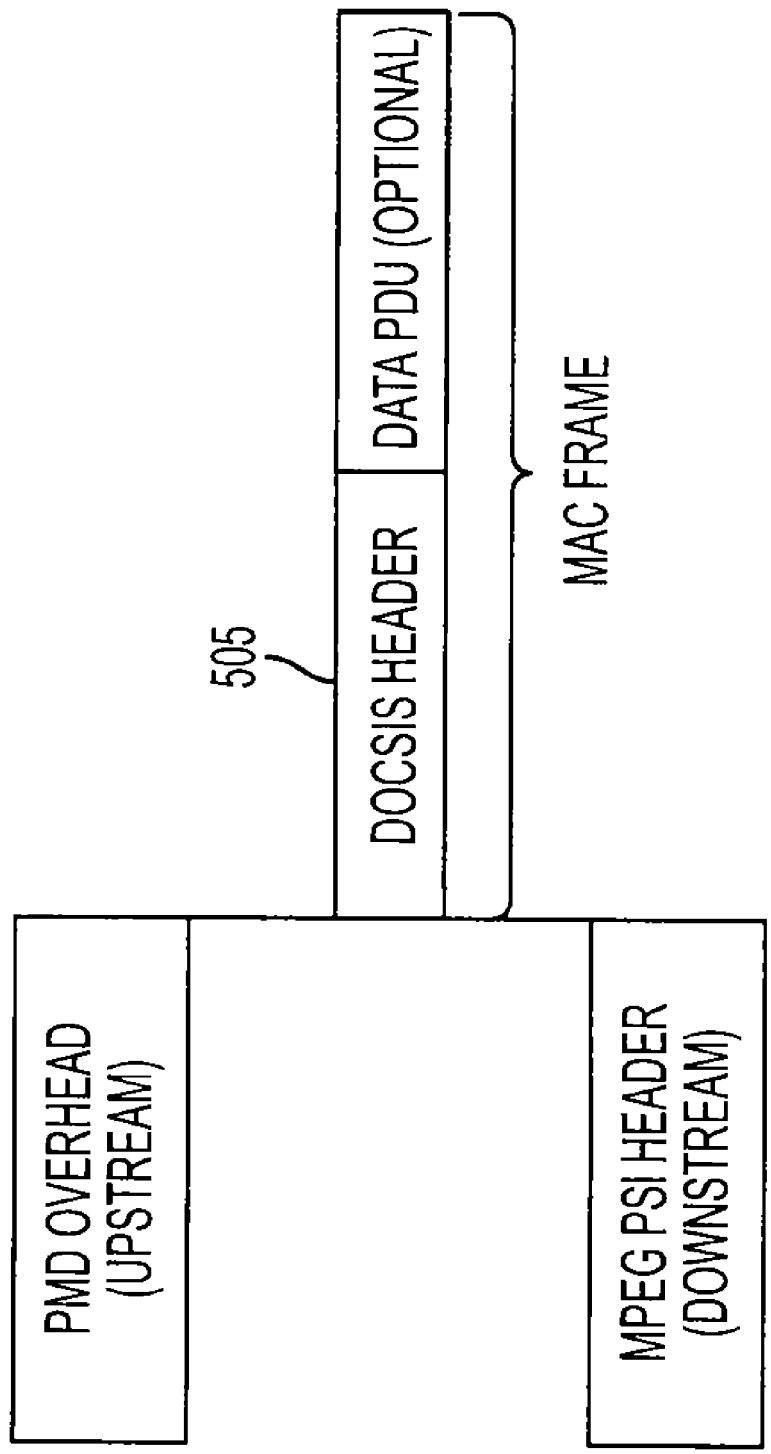
FIG. 5 is an illustration of a MAC frame format according to the DOCSIS protocol.

The primary function of DOCSIS header creator 316 is to generate a DOCSIS header in compliance with the DOCSIS specification. An example DOCSIS header 505 is provided in FIG. 5 described in detail below with reference to FIG. 6. The DOCSIS specification is available from Cable Television Laboratories, Inc., Louisville, Colo., and is incorporated herein by reference in its entirety.

The MAC 218 further includes an Encryption Key Fetch 330. The Encryption Key Fetch 330 is used to provide an encryption key for use in an encryption algorithm to encrypt and un-encrypt the data packet after the DOCSIS header has been appended to the data packet. In an embodiment, the Data Encryption Standard (DES) algorithm is used.

The MAC 218 is also provided with an encryption and cyclic redundancy control circuit 318. The encryption and cyclic redundancy control circuit 318 has two primary functions. The first function is used to encrypt the data packet using the encryption key provided by the encryption key fetch 330. The second function is to calculate a header check sequence (HCS) and a cyclic redundancy code (CRC). The HCS is a number derived from the DOCSIS header and is used to ensure its integrity. The CRC is a number derived from the length of the data packet and is used to detect corruption. By recalculating the CRC and comparing it to the value originally transmitted, the receiver can detect some types of transmission errors.

Once the DOCSIS header 505 has been added to the data packet, the data packet is passed to Down Stream Physical Interface (DS PHY) 335. DS PHY Interface 335 provides an interface to a physical layer chip (not shown) which is responsible for receiving data packets and subsequently transmitting the data packets downstream over a coaxial cable.

Figure 4:
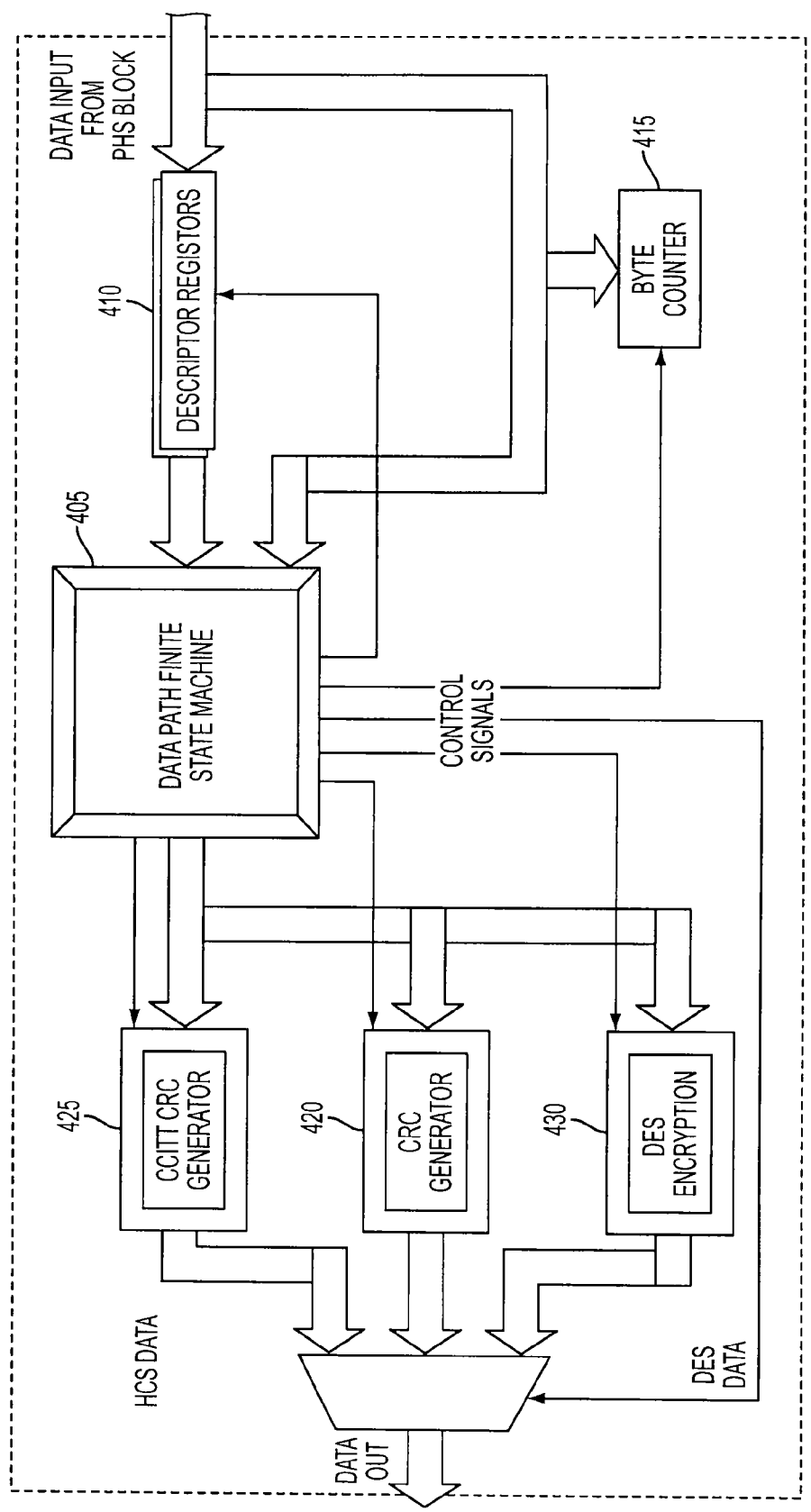
FIG. 4 is a schematic block diagram of a DOCSIS Header Creator in accordance with embodiments of the present invention.

FIG. 4 provides a detailed block diagram of the DOCSIS Header Creator 316 and the encryption and cyclic redundancy control circuit 318. The DOCSIS Header Creator is comprised of a datapath finite state machine 405 that is the heart of the DOCSIS Header Creator. This state machine is responsible for the generation of control signals during the different states of the DOCSIS packet processing. This state machine processes the data from the PHS processor block and at appropriate times, certain information is captured from the incoming data and/or the data is altered and sent out. During the descriptor capture phase, all the necessary flags in the descriptor are captured in the descriptor registers 410. These flags indicate whether the encryption and cyclic redundancy control circuit 318 would be generating CRC bytes using CRC generator 420 and CCITT CRC generator 425, performing encryption using DES encryption 430, or creating and inserting appropriate bytes into the output data stream as described in the DOCSIS specification. The byte counter 415 counts the number of incoming bytes during different states to ease the state machine in handling the data properly.

Figure 6:
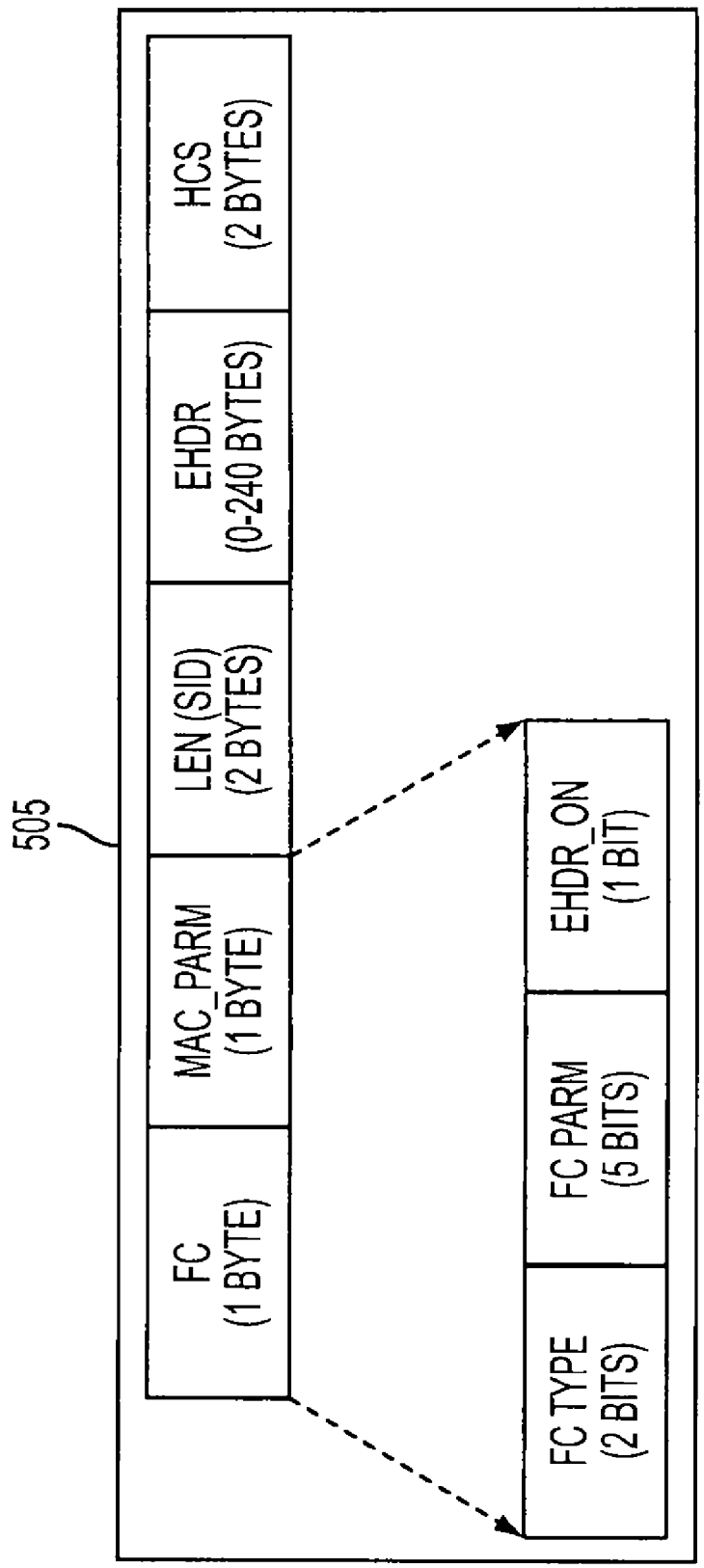
FIG. 6 is an illustration of a DOCSIS header format according to the DOCSIS protocol.

Referring to FIG. 6, an exemplary DOCSIS header 505 will now be described. The DOCSIS header 505 is comprised of a plurality of data fields. These data fields are used to identify the contents of the MAC frame 500 as well as to convey information about the data packet payload such as, for example, whether the payload's data type is voice, data, etc. As required by the DOCSIS protocol, the DOCSIS header 505 data fields include a Frame Control (FC) field, a MAC-PARM field, a LEN(SID) field, an EHDR field, and an HCS field.

The FC field is the first byte of the DOCSIS header 505 and is used to identify the remaining contents of the DOCSIS header 505. Following the FC field is a MAC-PARM field.

The MAC_PARM field serves several purposes depending on the value of the FC field. For example, if the EHDR_On indicator of the FC byte is set, then the MAC_PARM field is used as an extended header length. If the DOCSIS header 505 is concatenated, then the MAC_PARM is used to convey the number of MAC frames in the concatenation. If the MAC frame is a request to transmit, then the MAC_PARM field conveys the amount of bandwidth being requested. The MAC_PARM field is followed by the LEN (SID) field.

The LEN(SID) field indicates the length of the MAC frame 500. The LEN (SID) field can also be used to provide the Service ID of a particular cable modem in cases where no PDU (i.e., payload) follows the DOCSIS header. The LEN (SID) field is followed by the Extended Header (EHDR) field. The EHDR field is used to provide data link security and frame fragmentation. An exemplary method of creating a DOCSIS header in accordance with an embodiment of the present invention will now be described with respect to FIG. 8 and FIG. 9.

Figure 8:
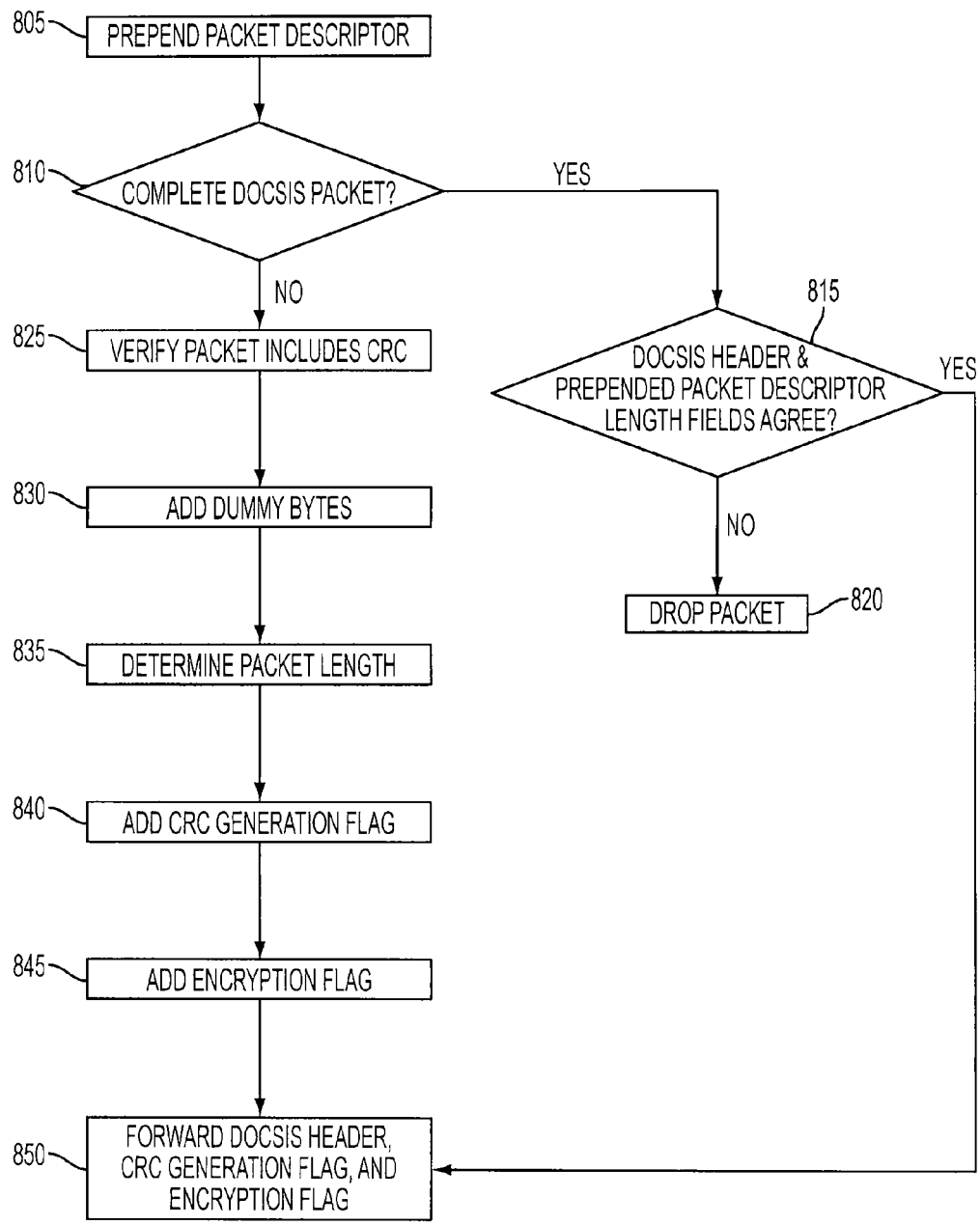
FIG. 8 is a flowchart diagram of a method for creating DOCSIS headers in accordance with embodiments of the present invention.
Figure 9:
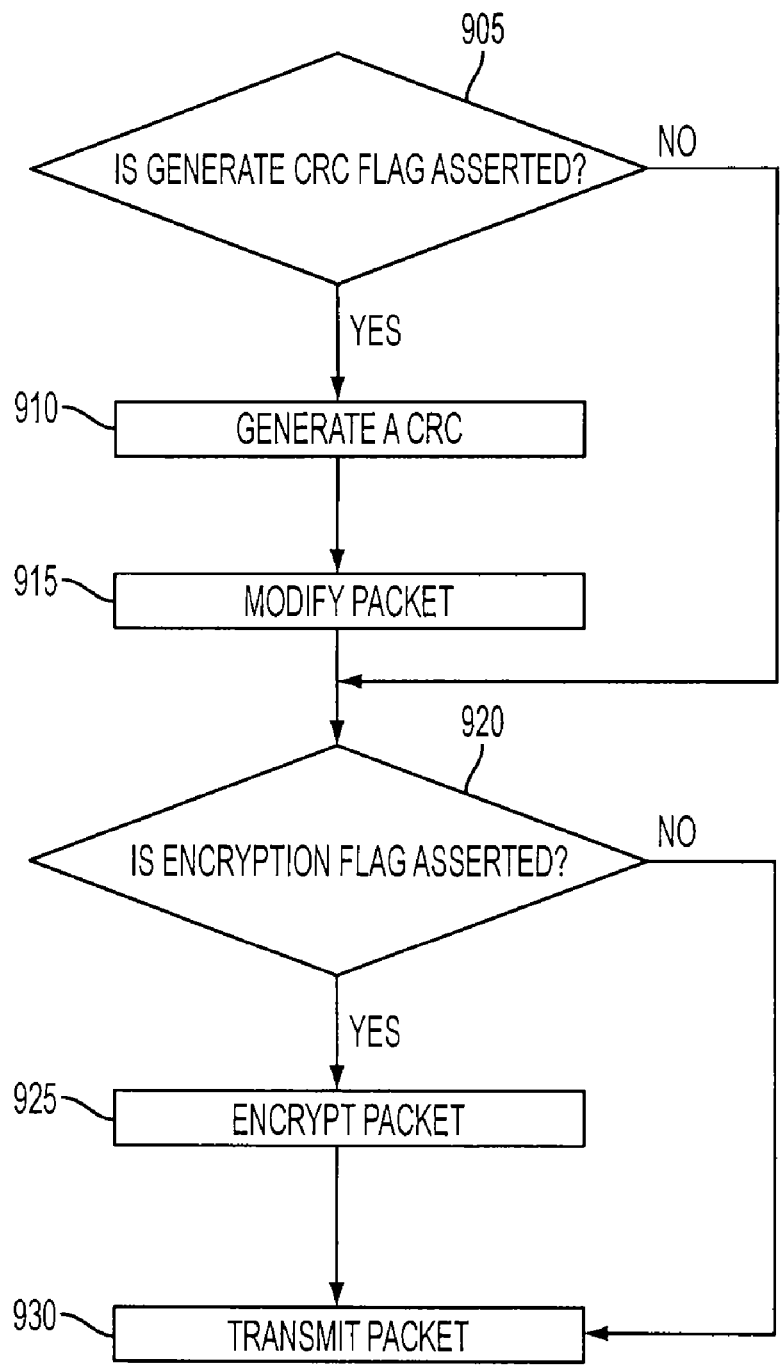
FIG. 9 is a flowchart diagram of a method for processing a DOCSIS packet header created in accordance with embodiments of the present invention.

The invention is not limited to the description provided herein with respect to the flowcharts depicted in FIGS. 8 and 9. Rather, it will be apparent to persons skilled in the relevant art(s) after reading the teachings provided herein that other functional flows are within the scope and spirit of the present invention. The flowcharts will be described with continued reference to the example MAC 218 of FIG. 2. and DOCSIS header 505 of FIG. 5 and FIG. 6.

Beginning in step 805 of FIG. 8, a packet descriptor is prepended to the data packet by Direct Memory Access. The prepended packet descriptor is a multi-field data structure generated by software. An exemplary packet descriptor is shown in FIG. 7. The multiple fields of the packet descriptor contain information that instruct the DOCSIS header creator 316 as to what sections of the DOCSIS header 505 need to be created. The prepended packet descriptor includes fields for generating CRC instructions, information for use in performing baseline privacy encryption, indicating a first packet size value, and indicating a packet header size value, for example. Table 1 provides a detailed description of the packet header descriptor fields. The fields of the packet descriptor are collectively referred to as the first set of fields.

In some cases, the host system will have already generated a DOCSIS header using software. Therefore, in step 810, the DOCSIS Header Creator 316 examines the data packet to see if the data packet already has a DOCSIS header. The DOCSIS Header Creator 316 compares the DOCSIS header and prepended packet descriptor length fields (pkt_len) values from the first set of fields in the descriptor against a second set of fields in the existing packet header. If a complete (i.e., existing) DOCSIS packet, with all the necessary fields, is supplied with the packet then the DOCSIS Header Creator 316 will not add any new headers and control passes instead to step 815.

In step 815, the DOCSIS Header Creator 316 will determine if the DOCSIS header and prepended packet descriptor length fields agree. More specifically, the DOCSIS header creator 316 will examine the packet size and the header size. If the packet header size and the prepended packet descriptor length field do not agree, then the data packet has been corrupted. Accordingly, in step 820, the data packet would be dropped (i.e., not further transmitted). Alternatively, if the DOCSIS header and prepended packet descriptor agree, then control passes immediately to step 850.

In step 850, the DOCSIS Header (provided by software), CRC Generation Flag (provided by software), and Encryption Flag (provided by software) are forwarded to the encryption and cyclic redundancy control circuit 318 for further processing.

Returning to step 810, if the DOCSIS Header Creator 316 determines that the data packet does not have a DOCSIS header then control passes to step 825.

In step 825, the DOCSIS Header Creator 316 checks the descriptor fields to see if the length of the packet includes the CRC. If not, in step 830, the Header creator adds one or more "dummy" bytes to the end of the packet and increases the length value by the number of bytes added. In the disclosed embodiment, four additional bytes are added as required by the DOCSIS specification.

Next, in step 835, the DOCSIS Header Creator 316 determines the length of the packet. The DOCSIS Header Creator 316 uses the length of the packet and the length of any EHDRs to determine the appropriate length field in the DOCSIS Header 505. Another important function performed in step 835 is checking to see if payload header suppression was performed by the PHS Header Suppress 315. If so, the DOCSIS Header Creator 316 receives the modified counts for header/packet sizes in order to compute the correct final packet size.

Next, in step 840, the DOCSIS Header Creator 316 generates a flag to signal encryption and cyclic redundancy control circuit 318 that CRC should be generated.

Next, in step 845, the DOCSIS Header Creator 316 generates a flag to signal encryption and cyclic redundancy control circuit 318 that baseline privacy encryption of the packet should be performed.

Finally, in step 850, the DOCSIS Header creator 316 passes the flags (if asserted) from steps 840 and 845, the complete DOCSIS header 505, and the data packet to the encryption and cyclic redundancy control circuit 318. Packet processing will be further described with respect to FIG. 9.

In FIG. 9, step 905, the encryption and cyclic redundancy control circuit 318 receives the transmitted data from DOCSIS Header creator 316 and checks the "generate CRC" flag. If this flag is asserted, then in step 910, encryption and cyclic redundancy control circuit 318 generates a CRC over the PDU and in step 915, modifies the packet by overwriting the added dummy bytes of the packet with the CRC value. In the disclosed embodiment, the last four bytes of the packet are overwritten.

In step 920, the encryption and cyclic redundancy control circuit 318 checks the "Baseline Privacy" flag. If the flag is set, then in step 925, the encryption and cyclic redundancy control circuit 318 encrypts the packet based on the indicated encryption algorithm (for example, the DES algorithm). If the flag is not set, then control passes to step 930 and the packet is transmitted without encryption. Prior to the execution of step 930, the DOCSIS Header Creator 316 will have created the DOCSIS header 505, complete with any extended headers and dummy bytes for HCS. In accordance with the DOCSIS specification, in the disclosed embodiment, two "dummy bytes" for the HCS would be added.

Finally, in step 930, the data packet, including the DOCSIS header 505 is forwarded to the DS PHY Interface 335 for transmission downstream.

CONCLUSION

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A hardware-implemented packet header generation circuit configured to receive data packets and information associated with descriptor words that were previously prepended to the data packets, the descriptor words indicating tasks to be performed by the packet header generation circuit, the hardware-implemented packet header generation circuit comprising:

an input node;

a plurality of descriptor registers having one or more corresponding information inputs coupled to the input node, and configured to capture and store the information associated with the descriptor words;

a control signal generator circuit configured to receive the data packets from the input node and the information associated with the descriptor words from the plurality of registers, and configured to generate the packet headers using the information associated with the descriptor words;

a data encryption flag generator circuit configured to receive a first set of one or more control signals from the control signal generator; and a cyclic redundancy code ("CRC") flag generator circuit configured to receive a second set of one or more control signals from the control signal generator;

whereby the control signal generator circuit is configured to control the data encryption flag generator circuit to generate an encryption flag for a data packet when the corresponding information associated with the descriptor words indicates that the data packet is to be encrypted;

whereby the control signal generator circuit is configured to control the CRC flag generator circuit to generate a CRC flag for the data packet when the corresponding information associated with the descriptor words indicates that the data packet is to include a CRC; and whereby the data packets and corresponding headers are forwarded for potential CRC processing and/or encryption, and thereafter for transmission over a wireless communication network.

2. The packet header generation circuit according to claim 1, wherein the plurality of descriptor registers are configured to capture and store one or more of the following types of information:

control information for CRC generation;

control information for payload header suppression processing; and control information for encryption.

3. The packet header generation circuit according to claim 1, wherein the plurality of descriptor registers are configured to capture and store one or more of the following types of information:

information indicating a first packet size value; and information indicating a packet header size value.

4. The packet header generation circuit according to claim 1, wherein the plurality of descriptor registers are configured to capture and store an encryption key.

5. The packet header generation circuit according to claim 1, wherein the control signal generator circuit is configured to add bytes to a data packet when the information associated with descriptor words indicate that the length of the data packet does not include a cyclic redundancy code, wherein the added bytes can be used by a CRC generator to insert the CRC.

6. The packet header generation circuit according to claim 1, wherein the plurality of descriptor registers are configured to capture frame control information, media access control information, packet header length information, and header check sequence information.

7. The packet header generation circuit according to claim 6, wherein the plurality of descriptor registers are configured to capture extended header information.

8. The packet header generation circuit according to claim 6, wherein the control signal generator circuit is configured to generate the packet header for a data packet after a determination is made that the data packet does not have an existing packet header.

9. The packet header generation circuit according to claim 6, wherein the control signal generator circuit is configured to include the packet header length information into the packet header.

10. The packet header generation circuit according to claim 6, further comprising a data encryption standard/header check sequence/cyclic redundancy code (DES/HCS/CRC) circuit coupled to an output of the packet header generation circuit and configured to generate cyclic redundancy codes, encrypt data packets, and generate header check sequences, in accordance with flags within the generated packet headers.

11. The packet header generation circuit according to claim 10, further comprising a data encryption standard key fetching circuit coupled to the DES/HCS/CRC circuit.

12. The packet header generation circuit according to claim 1, wherein the control signal generator circuit is configured to compare generated packet headers to corresponding information associated with descriptor words, and configured to determine whether packet sizes associated with the information, and at least a subset of the information, correspond to information within the generated packet headers and packet sizes associated with the generated packet headers.

13. The packet header generation circuit according to claim 12, wherein the plurality of descriptor registers are configured to capture length information, and wherein the control signal generator circuit is configured to compare the length information with corresponding generated packet headers.

* * * * *